Patented June 5, 1934

1,962,004

UNITED STATES PATENT OFFICE 1,962,004

COMPOSITION OF MATTER

Marc Darrin, Pittsburgh, Pa., assignor to F. N. Burt Company, Limited, Toronto, Ontario, Canada, a corporation of Ontario, Canada No Drawing. Application April 29, 1930, Serial No. 448,426

12 Claims. (Cl. 91—68)

This invention relates to a process of treating porous articles such as concrete, earthenware, tiling or the like.

It is an object of this invention to render articles of the character described stronger, more durable and impervious and resistant.

Concrete, cement, asbestos and ceramics and certain porous rocks such as sandstone have many advantages in the ease with which they may be formed into any shapes desired, and their generally inert character to many reagents. They are porous, however, and readily absorb liquids such as water, and this is frequently objectionable and may assist in their disintegration by time. They, particularly concrete, are not inert to some reagents, and they are not possessed of great strength.

Attempts to remedy these defects by filling the pores of the concrete with an inert substance such as sulphur are unsatisfactory by reason of the difficulty of causing the sulphur to penetrate the pores, that is the voids or interstices between the particles.

Sulphur, moreover, in such a matrix, solidifies under normal conditions in monoclinic crystals which are not stable at atmospheric temperatures, but are gradually converted into rhombic crystals with a shrinkage in volume. This shrinkage leaves pores or voids between the adjacent crystals so that the impregnated article again becomes porous.

Moreover, there is reason to believe that this change of form also results in a decrease of strength of the product.

In accordance with this invention, it has been found that certain compounds may be formed which will readily penetrate the pores, which solidify into permanently impervious masses, which are hard and inert and remain in place under extremes of weather conditions.

Sulphur, because of its abundance and its physical properties, is desirable as an impregnating material and it has been found in accordance with this invention that very desirable impregnating compounds may be formed with sulphur as a base. Asphalt and other bitumens, resins and waxes also have desirable properties such as imperviousness and permanence, but many of them are too soft, and some melt too readily, and when used alone they penetrate with such difficulty as to discourage their use.

In accordance with this invention it has been found that certain substances possess the property of greatly facilitating the introduction of impregnants into a matrix. These substances have been termed introfiers and they comprise a wide class of carbon compounds, having generally a plurality of cyclic nuclei.

It has further been found that by proper admixture these impregnants and introfiers may be so associated as to solidify in the pores, as a permanently impervious and inert mass, which strengthens the material, and which may, if desired, be made fire proof.

There is a distinct difference between the phenomenon of introfaction and the introduction of a compound by means of volatile solvents. In the phenomenon of introfaction, the facility with which the impregnant is introduced is very materially increased, sometimes severalfold, without materially changing the melting point of the compound and in many instances without any appreciable change in its viscosity,—for example, if a small amount of anthracene or chlorodiphenyls is added to sulphur, there is no apparent change in the physical characteristics of the compound but the speed and extent of penetration is very markedly increased with a pronounced increase in the permanent impermeability. The introfier will ordinarily be of a character to remain in the article impregnated, or in some instances it may be used in such small proportions that its volatilization will not be harmful.

When ordinary solvents are used, on the contrary, they do not assist as introfiers to increase the penetration except insofar as this incidentally results from the reduction in the viscosity. Since the phenomenon depends upon reduction in viscosity, the amount of solvent must be relatively high. In the final product the volatilization of the solvent causes a shrinkage which results in the mass becoming crumbly and unduly porous.

The class of introfiers generally appears to comprise mostly, the polycyclic compounds. Excellent results have been obtained with naphthalene, diphenyls and their derivatives.

Diphenyls and chlorodiphenyls form excellent introfiers and good results have been obtained with other substances in which the molecule contains a plurality of cyclic nuclei, as for example, higher diphenyls and chlorodiphenyls, diphenyl methane, benzyl ether, dibenzyl ketone, fluorene, carbazol, naphthalene, naphthols, naphthylamines, tetrahydronaphthalenes, monochloronaphthalenes, dichloronaphthalenes, trichloronaphthalenes, tetrachloronaphthalenes, pentachloronaphthalenes, and quinoline.

Substances having more than two cyclic nuclei, for example, anthracene, triphenyl methane and triphenyl phosphate, possess the property of introfiers, although they are more difficultly soluble in melted sulphur. Triphenyl phosphate in particular is powerful and while comparatively inexpensive, it produces excellent results.

Particularly good results have been obtained with mixtures of chlorodiphenyls including the two-cyclic diphenyls with higher members of the group. This substance is miscible with sulphur in all proportions and in itself forms an excellent impregnant and serves to render the product fire-proof when used in sufficient quantity. Moreover, the mutual solutions of sulphur and chlorodiphenyls are tougher and more resistant than when sulphur is used alone; and is cheaper, tougher and more satisfactory for many purposes than when chlorodiphenyls are used alone. Complete fire-proofing may be obtained by the employment of 65% of chlorodiphenyls with the sulphur but lesser amounts will produce a corresponding effect in reducing the combustibilty.

The chlorinated diphenyls are, moreover, particularly desirable because of the improvement in mechanical properties, a lack of unpleasant odors, their non-volatility and their strong introfying properties.

Naphthalene is an inexpensive and satisfactory introfier but where used in large porportions it may for many purposes be more desirable to employ halogen derivatives which are less volatile and more incombustible.

These introfying substances and particularly the chlorodiphenyls are miscible with a wide variety of dye stuffs and coloring matters and serve as a ready means of introduction of these dyes and coloring matters into the impregnant. A variation in the proportions of the ingredients will enable a wide variety of surface effects and textures to be obtained, as for example, certain proportions of sulphur and chlorodiphenyls have wax-like properties.

In many cases the proportions of the ingredients are limited by the mutual solubility. Where sulphur is employed with naphthalene or diphenyls or chlorodiphenyls, the proportions may be varied within wide limits since these substances are mutually soluble in almost all proportions.

When introfiers are employed with bitumens, which are naturally of a plastic nature, it is desirable to choose introfiers which will produce a hardening effect, such for example, as the higher chlorodiphenyls or other hard chlorinated hydrocarbons.

The introduction of the impregnating substance into the pores may be accomplished in any convenient manner. In the case of large articles such as a large surface of concrete the hard impregnant may be applied to the surface and heated to permit absorption. The degree of absorption by this method will depend in large part upon the depth to which the concrete is heated and the length of time that it is maintained hot and upon the character of the impregnant. With smaller articles, however, it is desirable to immerse them in a bath of the impregnating compound. For this purpose the bath is preferably kept at a temperature in the neighborhood of 120 to 140 degrees centigrade, depending upon the composition of the bath. Higher temperatures may be employed if desired for different compositions providing they be kept sufficiently low to prevent deterioration in the concrete or in the impregnating compound. The introduction of the impregnant into the pores is greatly facilitated by the application of pressure to the bath, also by vacuum to remove entrained gases.

With some articles it may be more convenient to make them of a porous ceramic such as unglazed pottery, or to cut from a soft natural rock such as sandstone, and then fill the pores with an impregnant as described. This is particularly useful in the making of containers, wash basins, laundry tubs, lavatory and laboratory equipment, panels, chemical equipment, electrical forms, tiling, piping, drains, or similar devices.

A product of this process is much stronger than concrete and is impervious and inert. It is therefore suitable for many uses where these properties are desired.

Since certain changes in carrying out the above process, and certain modifications in the composition which embody the invention may be made without departing from its scope, it is intended that all matter contained in the above description shall be interpreted as illustrative and not in a limiting sense.

It is also to be understood that the following claims are intended to cover all of the general and specific features of the invention herein described, and all statements of the scope of the invention which, as a matter of language, might be said to fall therebetween.

Having described my invention, what I claim as new and desire to secure by Letters Patent, is:—

1. A process of treating concrete or the like which consists in congealing within its pores sulphur and an introfier mixed in such proportions as to form a permanently impervious, inert, hard mass.

2. A process of treating concrete or the like which consists in congealing within its pores sulphur and a fire-proofing introfier mixed in such proportions as to form a permanently impervious, inert, hard, fire-proof mass.

3. A process of treating concrete or the like which comprises congealing within its pores a hard, sulphur containing mass crystalizing into permanent contiguous crystals without interstices between them.

4. A product comprising a matrix of concrete or the like having its pores completely filled with sulphur formed into a permanently inert, impervious, hard mass.

5. A product comprising a matrix of concrete or the like having its pores completely filled with a mixture of sulphur and an introfier in proportions to congeal into a hard, permanently impervious, inert mass.

6. A product comprising a matrix of concrete or the like having its pores completely filled with a mixture of sulphur and a fire-proofing introfier in proportions to congeal into a hard, permanently impervious, inert, fire-proof mass.

7. A product comprising a matrix of concrete or the like having its pores filled with a mixture containing sulphur and chlorodiphenyls adapted to congeal into a hard, permanently impervious, inert mass.

8. A product including a matrix of concrete or the like having its pores completely filled with a mixture containing sulphur and chlorodiphenyls in such proportions as to harden into a hard, permanently impervious, inert mass.

9. A process of treating a porous material such as concrete or the like, which comprises filling its pores with a mixture containing sulphur and chlorodiphenyls.

10. A process of treating a porous material such as concrete or the like, which comprises filling its pores with sulphur and chlorodiphenyls mixed in such proportions that the mixture forms into a permanently hard, impervious and inert mass.

11. A process of treating a porous material such as concrete or the like, which comprises filling its pores with a solution of substantially 65% chlorodiphenyls and 35% sulphur.

12. A product comprising an originally porous substance, such as concrete or the like, having its pores completely filled with a mixture of substantially 65% chlorodiphenyls and 35% sulphur.

MARC DARRIN.